US012531322B2

(12) United States Patent
Bouabdalli et al.

(10) Patent No.: US 12,531,322 B2
(45) Date of Patent: Jan. 20, 2026

(54) HEATABLE PLASTICS COMPONENT AND METHOD FOR PRODUCING

(71) Applicant: HELLA GmbH & Co. KGaA, Lippstadt (DE)

(72) Inventors: Mohcyn Bouabdalli, Zell im Wiesental (DE); Reiner Kimmig, Todtnau (DE); Yves Lecaillier, Ringsheim (DE); Ganeshkumar Poothathar, Chennai (DE); Roland Schwarz, Todtnau (DE); Thomas Stoll, Kleines Wiesental (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 748 days.

(21) Appl. No.: 17/896,845

(22) Filed: Aug. 26, 2022

(65) Prior Publication Data

US 2022/0407214 A1      Dec. 22, 2022

Related U.S. Application Data

(63) Continuation of application No. PCT/EP2021/054304, filed on Feb. 22, 2021.

(30) Foreign Application Priority Data

Feb. 28, 2020    (DE) .................. 10 2020 001 286.8

(51) Int. Cl.
*H01Q 1/02*        (2006.01)
*B29C 45/14*       (2006.01)
(Continued)

(52) U.S. Cl.
CPC .............. *H01Q 1/02* (2013.01); *G01S 7/027* (2021.05); *G01S 7/4047* (2021.05); *H01Q 1/422* (2013.01);
(Continued)

(58) Field of Classification Search
CPC .......... B29C 2045/14131; B29C 45/14; B29C 45/14344; B29C 45/14377;
(Continued)

(56) References Cited

U.S. PATENT DOCUMENTS

| 11,005,172 B2 | 5/2021 | Nicke et al. |
| 11,230,039 B2 | 1/2022 | Matsuo et al. |

(Continued)

FOREIGN PATENT DOCUMENTS

| DE | 10156699 A1 | 6/2003 |
| DE | 102005035814 A1 | 2/2007 |

(Continued)

OTHER PUBLICATIONS

International Search Report dated May 21, 2021 in corresponding application PCT/EP2021/054304.

*Primary Examiner* — Chris Q Liu
*Assistant Examiner* — James F Sims, III
(74) *Attorney, Agent, or Firm* — Muncy, Geissler, Olds & Lowe, P.C.

(57) ABSTRACT

A method for manufacturing a heatable plastic component for a motor vehicle, which includes: providing a planar heating film, which has a first surface and a second surface that faces away from and is opposite the first surface, including at least one heating wire and connecting elements; introducing the planar heating film into an injection mold; mounting a connector housing onto the connecting elements; and back-molding the first surface with a plastic for manufacturing a first partial element of the heatable plastic component in the injection mold. In order to provide an improved method for manufacturing a heatable plastic component, it is proposed that a back-molding of the second surface with a plastic for manufacturing a second partial element of the heatable plastic component in the injection (Continued)

mold takes place such that a composite is formed from the first partial element, the planar heating film and the second partial element.

6 Claims, 8 Drawing Sheets

(51) Int. Cl.
    *B29L 31/34*     (2006.01)
    *G01S 7/02*     (2006.01)
    *G01S 7/40*     (2006.01)
    *H01Q 1/42*     (2006.01)
    *H05B 3/28*     (2006.01)

(52) U.S. Cl.
    CPC .............. *H05B 3/286* (2013.01); *B29C 45/14* (2013.01); *B29L 2031/3456* (2013.01); *H05B 2203/017* (2013.01)

(58) Field of Classification Search
    CPC .......... B29C 45/14639; B29C 45/1642; B29C 45/1671; B29L 2031/3456; B29L 2031/3481; B29L 2031/3487; B29L 2031/36; G01S 13/931; G01S 7/027; G01S 7/4047; H01Q 1/02; H01Q 1/3233; H01Q 1/422; H01Q 1/425; H05B 2203/017; H05B 3/286
    USPC ........................................................ 219/202
    See application file for complete search history.

(56) References Cited

U.S. PATENT DOCUMENTS

| | | | |
|---|---|---|---|
| 2018/0215086 A1 | 8/2018 | Geise | |
| 2018/0287252 A1* | 10/2018 | Nicke | ............... H05K 1/028 |
| 2019/0111599 A1* | 4/2019 | Matsuo | ............ B29C 45/14778 |

FOREIGN PATENT DOCUMENTS

| | | |
|---|---|---|
| DE | 102010044598 B3 | 1/2012 |
| DE | 102014002438 A1 | 8/2015 |
| DE | 102014214329 A1 | 1/2016 |
| DE | 102015218876 A1 | 3/2017 |
| EP | 1902902 A1 | 3/2008 |
| EP | 3421215 A1 | 1/2019 |

\* cited by examiner

HEATABLE PLASTICS COMPONENT AND METHOD FOR PRODUCING

This nonprovisional application is a continuation of International Application No. PCT/EP2021/054304, which was filed on Feb. 22, 2021, and which claims priority to German Patent Application No. 10 2020 001 286.8, which was filed in Germany on Feb. 28, 2020, and which are both herein incorporated by reference.

BACKGROUND OF THE INVENTION

Field of the Invention

The present invention relates to a heatable plastic component and a method for the manufacture thereof.

Description of the Background Art

In motor vehicles, sensors are built into body parts, which are used, for example, to measure distance. Sensors of this type may be installed in a bumper on the front and/or rear side and detect the distance to an obstacle or a further vehicle during parking or driving. In the case of sensors working with radar waves, precautions must be taken which ensure that the electronic components are protected.

For this purpose, radar-transparent covers are known from the prior art, through which the radar radiation of the radar sensor is conducted. Such a cover of the radar sensor of a radar device is referred to as a radome. Radomes are installed in the region of the vehicle front of a vehicle, among other places. For example, they are integrated into the radiator grille or into the bumper of a motor vehicle in such a way that they are provided with a visually attractive and unobtrusive design.

A radome of this type is known from DE 10 2005 035 814 A1. The radome is introduced into the beam path of a conventional radar system in the front region of the motor vehicle, so that the other components of the radar system, in particular its transmitter and receiver, are protected against weather influences, such as moisture and strong sunlight, stone impact or the like.

It must furthermore be ensured that precautions are taken to avoid icing in winter. No ice layer, water layer or snow layer should form in front of the radiation region of the sensor, since the function of the sensor is otherwise, sometimes substantially, impaired by a layer of this type. For this purpose it is known to provide the radome with a heating device, as disclosed, for example, in DE 10 2014 214 329 A1. The heating device is designed as a heating film having a resistance track and is arranged in a film composite. The front side of this film composite forms a visible decorative film, which thus forms a part of the outer skin of the vehicle. This decorative film may be adapted to customer-specific requirements with regard to color, design, etc. On the rear side, the decorative film is connected to the heating film and subsequently to a carrier film over a wide area. After manufacturing, the film composite is back-molded with a thermoplastic plastic material. This carrier layer is designed as a cover part and forms the radome of the radar device, In DE 101 56 699 A1, a front screen made from plastic is manufactured in a characteristic structure or in the form of a brand emblem by means of injection molding. A rear wall is then manufactured from plastic, and conductor tracks of the heating device are applied thereto. The two plastic parts are subsequently joined together in a form fit.

DE 10 2014 002 438 A1 describes a method for manufacturing a heatable plastic radome, in which one or multiple electrically conductive wires are embedded into a film piece. The film piece is then formed together with the embedded electrically conductive wire and back-molded with a plastic in a further method step.

The aforementioned prior art includes a heating wire in a thin heating film, which has a diameter in the range from 40 µm to 50 µm, possibly also up to 60 µm, so that the visual perceptibility is reduced. Thin heating wires of this type made from copper or copper alloys may quickly break during deep drawing, molding or bending of the heating film, so that the function of the heating power is no longer ensured. Since the heating film is used to heat the outermost layer of the radome, it is arranged as close as possible to this outer layer, i.e., directly behind the visible front part of the motor vehicle. If the brand emblem or the radiator grille of the vehicle is situated in this location, the heating film molds to the contour, is possibly subjected to a strict bending radius, and the heating wires may break.

The disadvantage of the prior art is that deformations of the contour to the heating film may have an effect on the stability of the metallic heating wires of the heating film. The finer the deformation of the contour, i.e., the smaller the bending radius of the heating film, the higher is the probability that the thin heating wires will break.

SUMMARY OF THE INVENTION

It is therefore an object of the present invention to provide an improved method for manufacturing a heatable plastic component, such that the sensitivity of the at least one thin heating wire of the heating film may be taken into account, and all shapes and details of a contour may nevertheless be represented with a high degree of accuracy, taking economic interests into account.

In an exemplary embodiment, the method includes the following steps: providing a planar heating film, which has a first surface and a second surface, which faces away from and is opposite the first surface, including at least one heating wire and connecting elements for electrically connecting the at least one heating wire; introducing the planar heating film into an injection mold; mounting a connector housing onto the connecting elements of the planar heating film; back-molding the first surface of the planar heating film with a plastic for the purpose of manufacturing a first partial element of the heatable plastic component in the injection mold; and/or back-molding the second surface of the planar heating film with a plastic for the purpose of manufacturing a second partial element of the heatable plastic component in the injection mold in such a way that a composite is formed from the first partial element, the planar heating film and the second partial element.

The term composite can be understood to mean that all sides of the planar heating film are overmolded with a plastic. The heating film is integrally connected to a first partial element on its first surface or side and is also integrally connected to a second partial element on the opposite surface facing away therefrom, i.e. on the back of the first side. The first and second partial elements may extend beyond the surfaces of the heating film, i.e., they may cover a larger surface area than the heating film possesses and thus form a direct contact with each other. In this composite, the planar heating film is situated between the two partial elements, and the latter are connected directly to each other in an integral manner beyond the edges of the heating film. The integral connection between the first partial element and the second partial element may also be produced in that the heating film has at least one through-opening. The two partial elements are therefore integrally connected to each other with the aid of the through-opening. A connection of the first partial element to the second partial element is also indirectly possible as a composite, due to the planar heating film situated therebetween, without the first partial element being in direct contact with the second partial element.

The fact that a planar heating film is introduced into an injection mold has the advantage that the heating film may be easily and precisely positioned in the injection mold, since it has a planar or flat shape. Any type of deformation, folding or bending of the film makes the positioning in the injection mold difficult. Moreover, the resistance value of the heating film is changed by any type of deformation of the heating film, including pulling it in one direction. These fluctuations are undesirable, since a constant resistance value is predefined by the customer and must be maintained. Since the heating film does not undergo any expansion or bending, the sensitive heating tracks are not damaged, a closed circuit is given, and the heating function thereof is not impaired.

A connector housing is advantageously mounted onto the connecting elements of the heating film. This connector housing is thus integrally connected to the heating film by being back-molded with a plastic in such a way that the connecting elements protrude through the connector housing. The introduction of the heating film into the injection mold is simplified thereby, and the connector housing also reliably protects the thin and thus sensitive connecting elements against damage, for example in that they are not bent. This possible damage may occur during the introduction into the injection mold, during back-molding or even later on during the installation of the heatable plastic component. A customer-specific connectability to the power supply in the installation surroundings is also ensured.

The fact that a back-molding of the first surface of the planar heating film with a plastic for manufacturing a first partial element of the heatable plastic component takes place in the injection mold has the advantage that the first partial element may be manufactured from a first plastic. This material may differ from a second plastic material, which is used for back-molding in a further method step. The plastic material may also be identical.

A back-molding of the second surface of the planar heating film with a plastic for the purpose of manufacturing a second partial element of the heatable plastic component in the injection mold advantageously takes place in such a way that a composite is formed from the first partial element, the planar heating film and the second partial element. The heating film is thus incorporated between the two partial elements in a form-fitting and integral manner, and the heating wires are protected against mechanical damage. The electrically conductive heating wires are also protected against chemical damage, which could occur, for example, by corrosion due to splashes of salt water onto the road. In the second injection molding operation, a different plastic material may be used than during the back-molding to form the first partial element. The material may differ from the first plastic material of the first partial element in terms of its composition and/or color. A free selection of the surface structure, such as a pattern, engraving or color effects, may also be made. The heatable plastic component is advantageously economical to manufacture in large quantities using only one injection molding die.

The second surface of the heating film is advantageously back-molded with the plastic in such a way that only a partial region of the second surface of the heating film is covered to form the second partial element. It is thus possible to apply any arbitrary contour to the heating film, such as a brand emblem or a lamellar structure. The application of the plastic results in a raised area of an arbitrary shape on the heating film. This bulge is then inserted into the cavity of a front element 510. As a result, no hollow space forms between the heating film and front element 510, which would impair the function of the radar device.

It is advantageously provided that the planar heating film has at least one through-opening, through which the second partial element is integrally connected to the first partial element. The heating film is securely and fixedly connected between the two partial elements thereby. Any creasing of the heating film which may occur due to the injection molding pressure may furthermore be compensated for.

The second surface of the heating film is advantageously back-molded with the plastic in such a way that the entire surface area of the second surface of the heating film is covered to form the second partial element. The planar heating film is thus completely surrounded by plastic, i.e., an integral composite is formed, and is not exposed to any external influences, such as spray water. The heating wires of the heating film are thus protected against corrosion.

It is furthermore advantageously provided that a front element is placed over the second element in a precisely fitting manner in such a way that the front element covers the entire surface area of the heating film, overlays the heating film on the outer sides of the surfaces and is connected to the first partial element, in particular by gluing. Since the second partial element may take on arbitrary contours according to the customer's wishes, flexible possibilities are provided for designing the front element.

Fastening elements are advantageously injection-molded on the first element for fastening to the motor vehicle. The heatable plastic component may thus be installed directly on the vehicle without having to undergo a further processing step.

It is also advantageously provided that the connecting elements include electrically conductive material and are riveted to the planar heating film. Any tensile stress that may occur, as is the case during welding or soldering, is kept away from the sensitive heating wires of the heating film, and a stressing of the mechanical components is minimized. The riveting results in an easy, fast, favorable and robust way to non-detachably connect the thin film to the connecting elements for the electrical connection of the heating wires.

The first partial element is advantageously injection-molded with a different plastic material than the second partial element. The material may be arbitrarily varied in in terms of its composition and/or color.

The aforementioned object is also achieved by a heatable plastic component.

The advantages of the heatable plastic component correspond to the advantages mentioned above with reference to the method according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
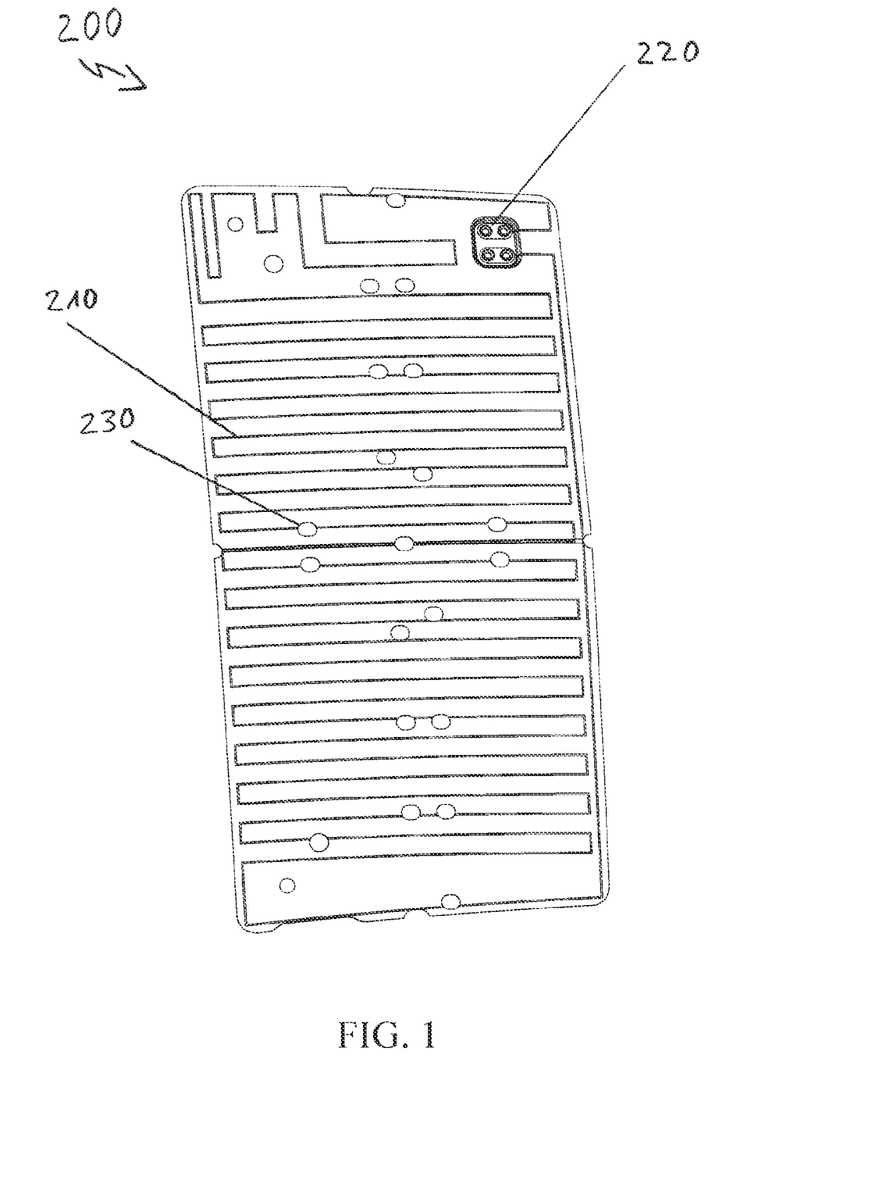
FIG. 1 shows a schematic representation of a planar heating film, which includes at least one heating wire.

FIG. 1 shows a flat heating film 200 in its initial state. The film is designed as a planar element having two sides. The one side is referred to as the first surface, and the opposite side facing away therefrom is referred to as the second surface. This planar heating film 200 includes at least one heating wire 210. Heating film 200 may be manufactured from a thermoplastic plastic, such as polyethylene naphthalate (PEN), polycarbonate (PC), polyimide (PI), polymethyl methacrylate (PMMA) or the like. Heating wire 210 is made from a conductive material, for example copper. In this view, heating wire 210 is mounted to rest upon a first surface. Instead of the one heating wire 210, for example, multiple heating wires may be correspondingly mounted on the film. The heating wires may also be embedded into heating film 200. They are arranged in such a way that they not only form a radar-transparent structure but also provide a sufficient heating power, which ultimately permits the plastic cover to be free of frost. The geometry of heating film 200 illustrated here as well as the geometric laying of the heating wire is shown as an example in FIG. 1 and may have any other geometric shape. The geometry of heating film 200 in this exemplary embodiment is selected to be rectangular, and the heating wires are arranged, for example, in a meandering manner on or alternatively in, i.e. embedded into, heating film 200.

To position planar heating film 200 in the injection mold later on, positioning holes are arranged in heating film 200, which do not impair the heating power. In all exemplary embodiments, heating film 200 may also have through-openings 230 for an integral connection, which are described in the discussion of FIG. 3. Multiples of the at least one through-opening 230 are schematically illustrated here. In the case of multiple through-openings 230, the latter are also situated between the windings of the at least one heating wire 210 and do not impair the function of the at least one heating wire 210.

Figure 1A:
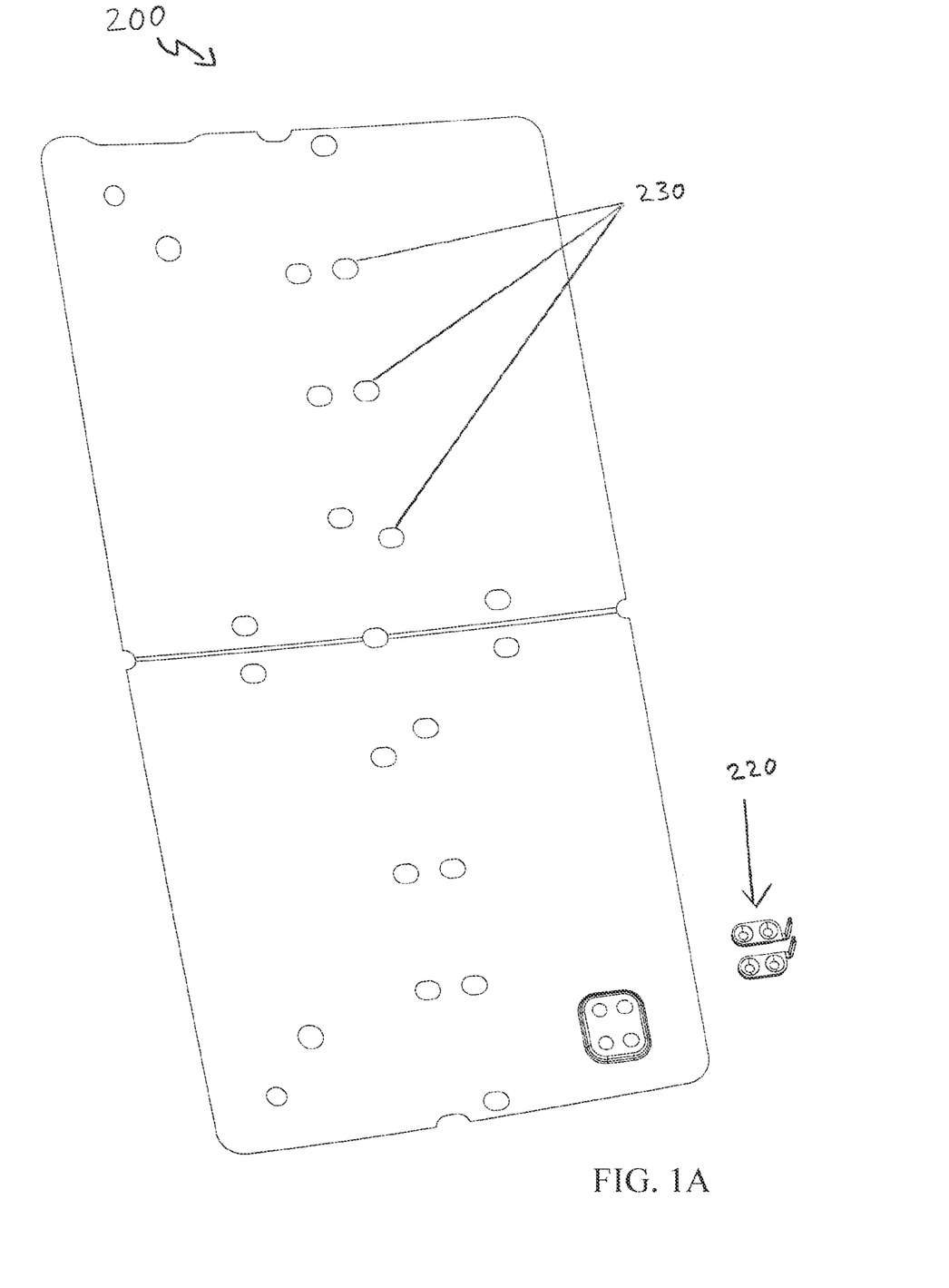
FIG. 1A shows a further schematic representation of the planar heating film.

FIG. 1A shows a schematic representation of heating film 200 with the arrangement of multiple through-openings 230. The at least one heating wire 210 is not illustrated in this view. Connecting elements 220 made from electrically conductive material are provided for the purpose of electrically contacting the at least one heating wire 210. The particular ends of the at least one heating wire 210 of planar heating film 200 are connected to these connecting elements 220 at one location of heating film 200 to facilitate an electrical connection. Connecting elements 220 are schematically illustrated as an individual component next to the heating film. These connecting elements 220 are preferably connected to the film by rivets, so that a stable and reliable electrical contact occurs. In the lower right region of this representation of heating film 200, a square surface is indicated, which show the contact region of connecting elements 220 with heating wire 210, which is not illustrated. In this region, connecting elements 220 are riveted to heating film 200. The riveting of thin heating film 200 and connecting elements 220 also results in a force-fitting composite, which minimizes the tensile stress on the at least one heating wire 210.

Figure 1B:
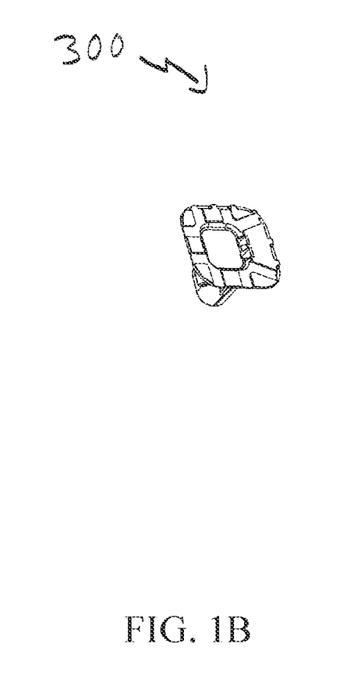
FIG. 1B shows a schematic representation of the connector housing.

Before planar heating film 200 is introduced into the injection mold, a connector housing 300, which is illustrated in FIG. 3B, may be mounted onto connecting elements 220. Electrical connecting elements 220 are passed through connector housing 300 so that, after the back-molding, a standard connection of the at least one heating wire 210 to the power supply or the vehicle electrical system of the motor vehicle via connecting elements 220 is given; cf. FIG. 5.

Planar heating film 200 assembled in this manner is introduced into a mold of an injection molding die. Since heating film 200 is flat, it may be quickly and easily positioned in the injection mold with the aid of preconfigured positioning openings. Mounted connector housing 300 also facilitates an easy introduction into the injection mold and protects thin connecting elements 220 against mechanical damage. Connector housing 300 also simplifies the introduction into the injection mold. As a result, any type of deformation of the heating film, including pulling it in one direction, is avoided. Since the resistance value of the heating wire changes, in particular if the heating wire is folded, the method step of introducing the heating film into the injection mold is particularly important. Fluctuations in the resistance value of the heating wires are undesirable, since a constant resistance value is predefined by the customer and must be maintained. This saves time during the manufacturing process and facilitates a secure introduction into the injection mold without heating film 200 slipping or being displaced by mistake during the back-molding under high pressure. Heating film 200 is then back-molded with a thermoplastic plastic on its first planar side, for example on the one where connector housing 300 is placed on connecting elements 220. Due to this first injection-molding operation, a first partial element 400 is produced, which is connected to planar heating film 200 in a form-fitting and integral manner. Connector housing 300 is also connected to heating film 200 by overmolding and back-molding with the plastic. For example, a carrier element is produced, which is arranged in front of heating film 200 in the optical path direction of the radar device.

Figure 2:
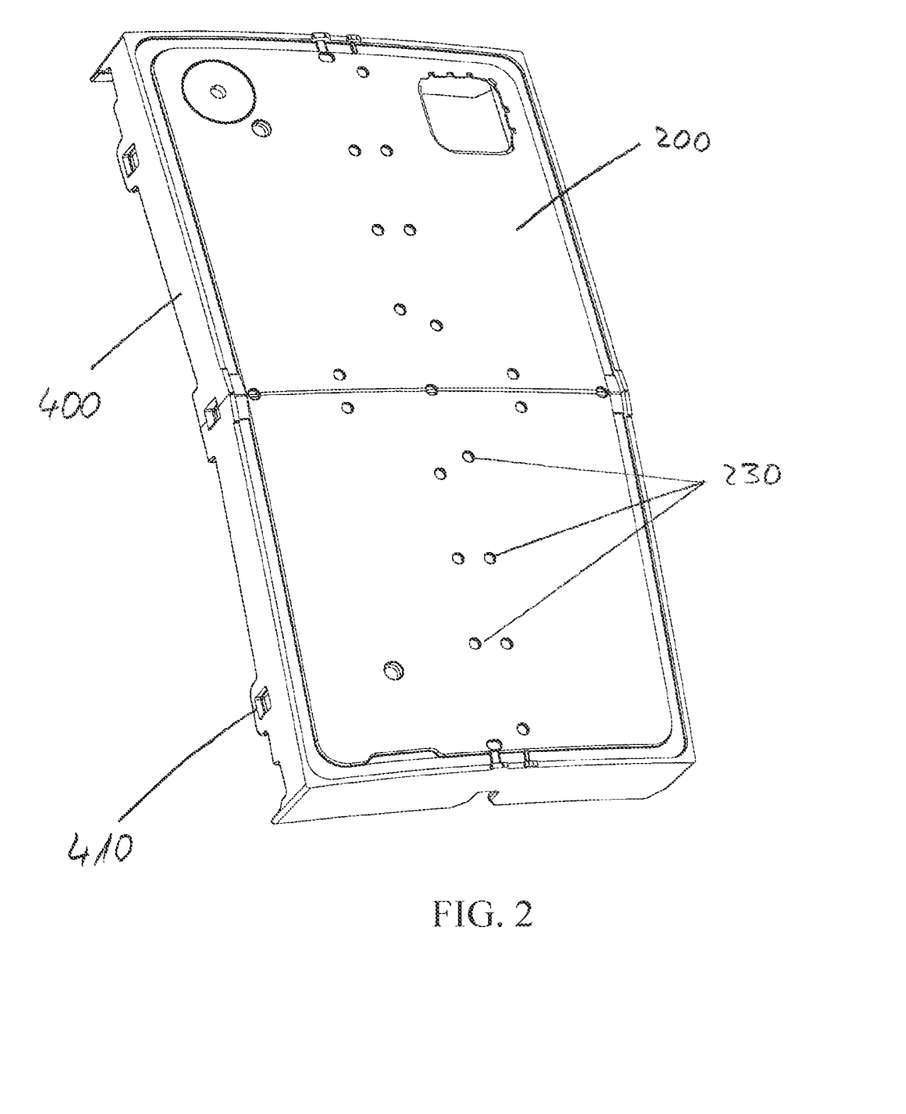
FIG. 2 shows a schematic representation of the heating film, including the first partial element.

FIG. 2 shows the composite made from this first partial element 400 and planar heating film 200, illustrated in this case without heating wire 210, the composite being formed by the back-molding. Connector housing 300 is also fixedly connected to first partial element 400 on the rear side of heating film 200 by means of back-molding. This situation is indicated schematically by the square recess at the upper right in heating film 200. Connecting elements 220 from FIG. 1A, which protrude through connector housing 300, are not impaired during the back-molding of connector housing 300. Fastening elements 410, which facilitate a later mounting of heatable plastic component 100, in particular of the heated radome, in the motor vehicle, may also be injection-molded on first partial element 400, the carrier element in this representation. The projecting edges of first partial element 400, which protrude over the edges of heating film 200, are apparent in FIG. 2. Heating film 200 is thus embedded into first partial element 400 in a mechanically stable manner. First partial element 400 remains in the injection mold, while the latter, used as a turnover injection molding device, may be turned in order to mount second partial element 500 onto planar heating film 200 by means of back-molding. The back-molding of the second partial element may also take place without turning the injection mold. Through-openings 230, multiple of which are apparent in heating film 200 in this figure, not only facilitate the connection of the edges to second partial element 500 but also the integral bonding of first partial element 400 thereto. Fastening elements 410 are also illustrated, which make it possible to place heatable plastic component 100 in an installation environment.

In this next method step, the second surface of heating film 200 is back-molded with a plastic, in particular a thermoplastic plastic. This material may be identical to the material of first injection molding, or a different material is used.

Figure 3:
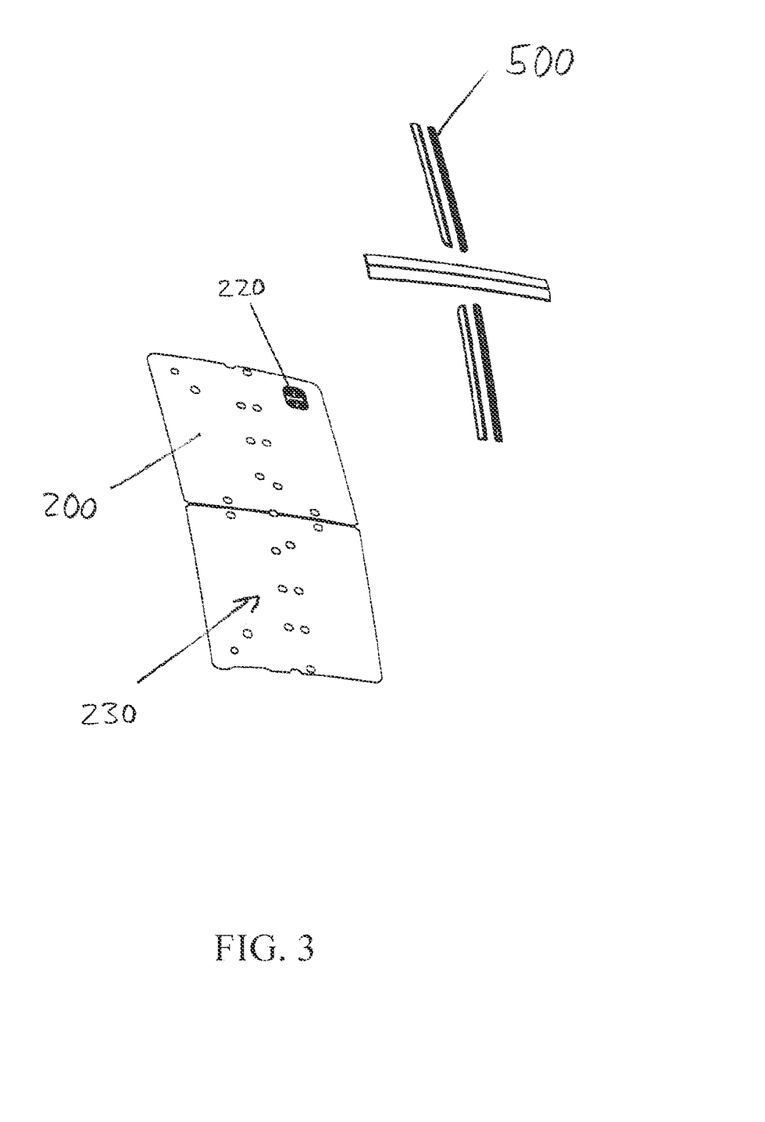
FIG. 3 shows an exploded representation of an exemplary embodiment.

FIG. 3 shows an exploded representation of an example of a surface structure, which may be applied during the second injection-molding operation. The injection molding die may be turned for the second injection-molding operation, so that the second planar side of heating film 200 is back-molded. Second partial element 500 is injection-molded on this side of heating film 200. This second partial element 500 is arranged, for example, behind heating film 200 in the optical path direction of the radar device if first partial element 400 is arranged in front of heating film 200 in the optical path direction of the radar device. This part of heatable plastic component 100, in particular the heatable radome, may be provided with a customer-specific design.

For example, if a brand emblem or a lamellar shape is to be depicted, hollow spaces occur on the rear side of front element 510, which would impair the radar function and, in the worst case, have an interfering effect. In the second injection-molding method step, these structures are specifically back-molded onto heating film 200 as second partial element 500. In FIG. 3, for example, a web having lamellas is injection-molded onto heating film 200 as a bulge. These bulges, which are shown here as an exploded representation, are connected in a form-fitting manner to heating film 200 and to first partial element 400, which is not illustrated here. If second partial element 500 is back-molded with its outer edges beyond the edges of heating film 200, an integral connection of first partial element 400 to the second partial element occurs over the edges. Heating film 200 may also have at least one through-opening 230, so that first partial element 400 may be integrally connected to second partial element 500 through this opening. This at least one through-opening 230 is introduced into planar heating film 200 in such a way that it is arranged between heating wire 210, which is laid, for example, in a meandering manner and is not illustrated here, and does not impair the heating function.

Figure 3A:
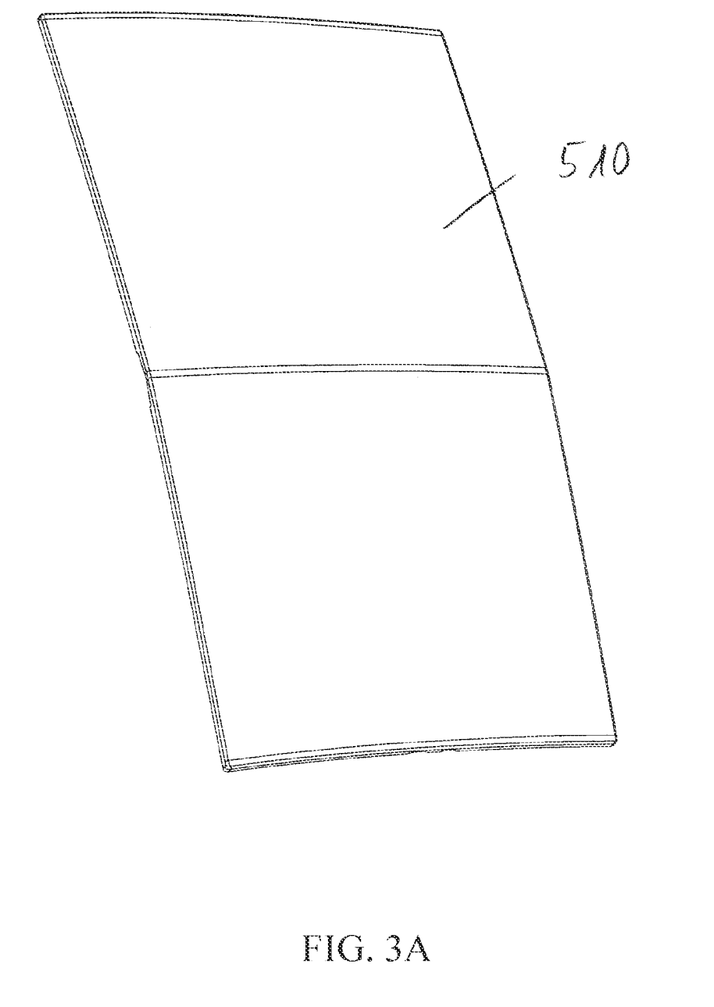
FIG. 3A shows a schematic representation of a front element.

FIG. 3A represents a customer-specific front element 510. This may, of course, deviate from this exemplary embodiment. This customer-specific front element 510 is laid with its cavities so as to fit precisely on the bulges of second carrier element 500. Front element 510 and first partial element 400 are fastened to each other, for example by gluing.

Figure 4:
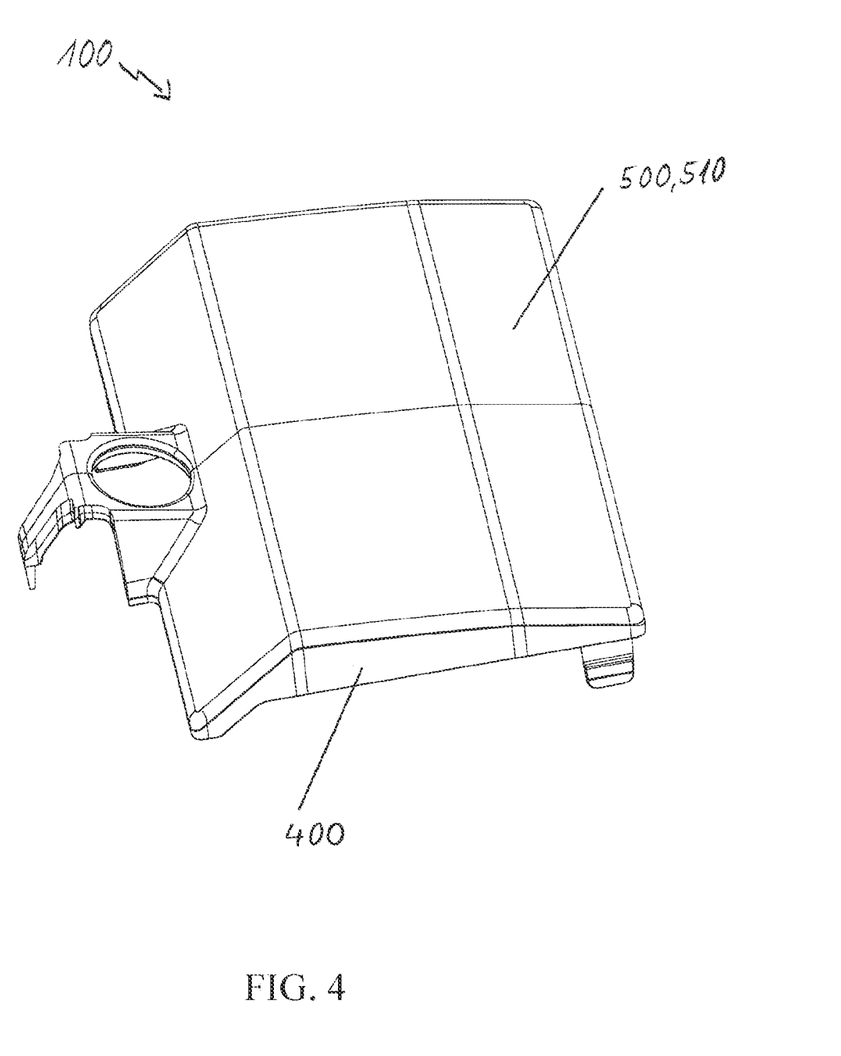
FIG. 4 shows a schematic representation of an exemplary embodiment.

FIG. 4 shows heatable plastic component 100 as a finished part, as installed as a separate component. In this further exemplary embodiment, second partial element 500 is designed as front element 510, which is manufactured by back-molding over the entire area in the second injection molding method step. Like first partial element 400, second partial element 500 is also back-molded beyond the edges of planar heating film 200, so that it covers a greater surface area than heating film 200. These edges of first partial element 400 and second partial element 500 thus lie on top of each other in an integral manner. In this exemplary embodiment, heating film 200 may alternatively also have through-openings 230, so that the integral connection may take place not only via the edges but also with the aid of through-openings 230. The two partial elements 400, 500 are therefore connected to each other in such a way that planar heating film 200 is situated therebetween in a form-fitting and integral manner, and heating film 200 and thus also heating wires 210 are optimally protected against damage.

Since the one-piece finished part is produced as a composite from first partial element 400, heating film 200, connector housing 300 and second partial element 500, it may be installed directly without further manufacturing steps having to take place. Since the electrical connection with connecting elements 220, which are passed through connector housing 300, takes place to the power supply, for example the vehicle electrical system of a motor vehicle, this permits an immediate connection. The electrical connection therefore does not need to be established by welding or soldering. Likewise, no reworking or further intermediate processing steps of the injection-molded heatable plastic component 100 are necessary in the sense that further elements would have to be mounted. Radome 100 may be installed, for example, as a cover directly in front of the radar device.

In the second injection-molding method step, the back-molding may take place with a different plastic material than the plastic used in the first injection-molding process. For example, second partial element 500 may be visible front element 510 and should thus be able to effectively conduct the generated heat to the outside. The plastic material may be provided with additives for this purpose, which facilitate a better heat conductivity. These may be, for example, metal particles, carbon and/or ceramic particles and/or other additives.

A thermoplastic plastic, in particular polyethylene naphthalate, polypropylene, polycarbonate, polyethylene and/or polymethyl methacrylate may be used as plastic material for both partial elements 400, 500.

Figure 5:
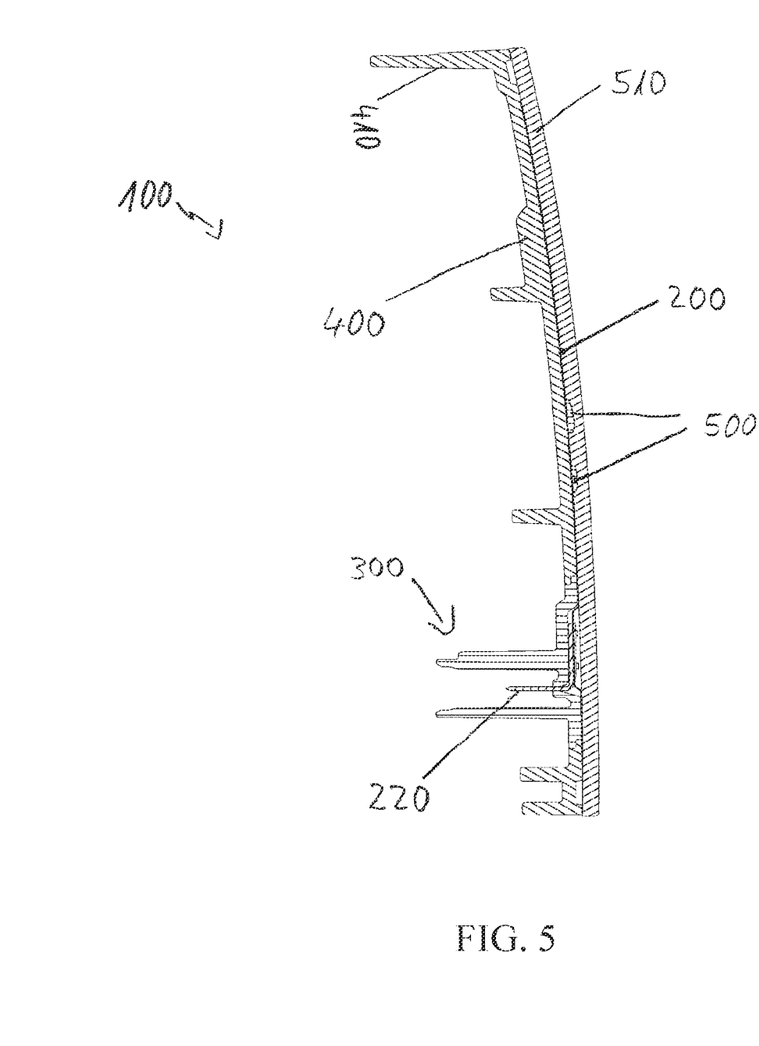
FIG. 5 shows a sectional representation of the heatable plastic component.

FIG. 5 shows a sectional representation of heatable plastic component 100 according to the invention. Planar heating film 200 is integrally back-molded to first partial element 400. First partial element 400 includes fastening elements 410 and back-molded connector housing 300. Electrical connecting element 220 is passed through connector housing 300. The location on connecting element 220, where the latter is riveted to heating film 200, is covered by connector housing 300. Second partial element 500 is injection-molded onto heating film 200. Front element 510 has cavities in locations where they abut second partial element 500 in a form-fitting manner.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for manufacturing a heatable plastic component, for a motor vehicle, the method comprising:
   providing a planar heating film that has a first surface and a second surface, which faces away from and is opposite the first surface, including at least one heating wire and connectors to electrically connect the at least one heating wire;
   introducing the planar heating film into an injection mold;
   mounting a connector housing onto the connectors of the planar heating film;
   back-molding the first surface of the planar heating film with a plastic for the purpose of manufacturing a first partial element of the heatable plastic component in the injection mold; and
   back-molding the second surface of the planar heating film with a plastic for the purpose of manufacturing a second partial element of the heatable plastic component in the injection mold such that a composite is formed from the first partial element, the planar heating film and the second partial element,
   wherein the second surface of the planar heating film is back-molded with the plastic such that only a partial region of the second surface of the planar heating film is covered to form the second partial element, and
   wherein the planar heating film has at least one through-opening, through which the second partial element is integrally connected to the first partial element.

2. The method according to claim 1, wherein a front element is mounted over the second partial element in a precisely fitting manner such that the front element covers the entire surface area of the planar heating film, overlays the planar heating film on the outer sides and is connected to the first partial element by gluing.

3. The method according to claim 1, wherein the connectors include electrically conductive material and are riveted to the planar heating film.

4. The method according to claim 1, wherein the first partial element is injection-molded with a different plastic material than the second partial element.

5. A method for manufacturing a heatable plastic component for a motor vehicle, the method comprising:
   providing a planar heating film that has a first surface and a second surface, which faces away from and is opposite the first surface, including at least one heating wire and connectors to electrically connect the at least one heating wire;
   introducing the planar heating film into an injection mold;
   mounting a connector housing onto the connectors of the planar heating film;
   back-molding the first surface of the planar heating film with a plastic for the purpose of manufacturing a first partial element of the heatable plastic component in the injection mold; and
   back-molding the second surface of the planar heating film with a plastic for the purpose of manufacturing a second partial element of the heatable plastic component in the injection mold such that a composite is formed from the first partial element, the planar heating film and the second partial element,
   wherein fasteners are injection-molded onto the first partial element for fastening to the motor vehicle.

6. A heatable plastic component, comprising
   a planar heating film, which has a first surface and a second opposite surface facing away therefrom, including at least one heating wire and including electrically conductive connectors for the at least one heating wire;
   a connector housing for the electrically conductive connectors to be passed through; and
   a first and a second partial element as a composite with the planar heating film formed by integrally back-molding the first surface and the second surface of the planar heating film with a plastic,
   wherein the second partial element is designed such that only a partial region of the second surface of the planar heating film is integrally covered with the plastic, and
   wherein the planar heating film has at least one through-opening, through which the second partial element is integrally connected to the first partial element.

* * * * *